United States Patent
Amano et al.

(10) Patent No.: US 7,708,552 B2
(45) Date of Patent: May 4, 2010

(54) INJECTION MOLDING MACHINE (75) Inventors: Masahiro Amano, Okazaki (JP);
Yoshiharu Isoshima, Okazaki (JP)

(73) Assignee: Toyota Jidosha Kabushiki Kaisha,
Toyota-shi, Aichi-ken (JP)

( * ) Notice: Subject to any disclaimer, the term of this patent is extended or adjusted under 35 U.S.C. 154(b) by 252 days.

(21) Appl. No.: 11/884,346

(22) PCT Filed: Feb. 15, 2006

(86) PCT No.: PCT/JP2006/303093

§ 371 (c)(1),
(2), (4) Date: Aug. 15, 2007

(87) PCT Pub. No.: WO2006/088215

PCT Pub. Date: Aug. 24, 2006

(65) Prior Publication Data

US 2008/0260891 A1 Oct. 23, 2008

(51) Int. Cl.
*B29C 45/64* (2006.01)
(52) U.S. Cl. .................................. 425/595; 425/451.9
(58) Field of Classification Search .............. 425/589, 425/595, 451.9
See application file for complete search history.

(56) References Cited

U.S. PATENT DOCUMENTS

| | | | | |
|---|---|---|---|---|
| 4,222,731 A | * | 9/1980 | Enrietti et al. | 425/451.9 |
| 4,878,828 A | * | 11/1989 | Wollschlager et al. | 425/589 |
| 5,478,231 A | | 12/1995 | Hehl | |
| 5,536,166 A | | 7/1996 | Schad | |
| 6,203,312 B1 | * | 3/2001 | Romi | 425/595 |

FOREIGN PATENT DOCUMENTS

| | | |
|---|---|---|
| DE | 3624615 | 1/1988 |
| EP | 0 726 131 | 8/1996 |
| EP | 0 879 688 | 11/1998 |
| EP | 0 894 605 | 2/1999 |
| EP | 0 945 243 | 9/1999 |
| JP | 6-344406 | 12/1994 |
| JP | 7-148806 | 6/1995 |
| JP | 8-294949 | 11/1996 |
| JP | 11-34123 | 2/1999 |
| WO | WO 94/17977 | 8/1994 |

OTHER PUBLICATIONS

Japanese Office Action dated Feb. 10, 2009.

(Continued)

*Primary Examiner*—James Mackey
(74) *Attorney, Agent, or Firm*—Finnegan, Henderson, Farabow, Garrett & Dunner, LLP (57) ABSTRACT

An injection molding machine comprises a stationary platen 46 and a movable platen 40. The stationary platen 46 and movable platen 40 may be supported on a base frame 10. A mold clamping frame 56 comprises a first member 54 joined to the stationary platen 46, a second member 24 joined to the movable platen 40, and connecting members 78 and 80 for connecting the first member 54 and the second member 24 at their approximate centers. A mold clamping cylinder 50 is disposed between the first member 54 and the stationary platen 46 or between the second member 24 and the movable platen 40. The stationary platen 46 and the first member 54 are joined in a flexible manner, and the movable platen 40 and the second member 24 are similarly joined in a flexible manner.

10 Claims, 3 Drawing Sheets

OTHER PUBLICATIONS

International Search Report dated May 19, 2006.
Written Opinion of the International Searching Authority.
Second Office Action for Chinese Application No. 200680005049, dated Aug. 28, 2009.

* cited by examiner

INJECTION MOLDING MACHINE

TECHNICAL FIELD

This application claims priority to Japanese Patent Application No. 2005-38013 filed on Feb. 15, 2005, the contents of which are hereby incorporated by reference.

The present invention relates to an injection molding machine that has a stationary platen supporting a stationary mold and a movable platen supporting a movable mold.

BACKGROUND ART

In an injection molding machine, mold clamping force is usually exerted between a stationary platen and a movable platen during the clamping operation of the stationary mold and the movable mold, and a mold clamping frame receives reactive force of this mold clamping force. A known mold clamping frame (a so-called C-type frame) comprises a first member, a second member facing the first member, and a connecting member that links a lower end of the first member with a lower end of the second member. The first member is connected to a stationary platen, and the second member is connected to a movable platen. In this type of mold clamping frame, the reactive force of the mold clamping force is exerted on the first member and the second member, and bending moment is exerted on the connecting member. The connecting member bends due to the bending moment, and the first member and the second member are pushed open. It is consequently not possible to maintain the parallelism between the stationary platen and the movable platen. As a result, burrs are formed in the molded part.

Conventionally, the method of solving this problem has been to increase the rigidity of the connecting member and to suppress its bending deformation to a level that is not problematic. However, the problem with this method is that the mold clamping frame becomes larger and heavier. To deal with this, an injection molding machine has been developed to prevent the connecting member from bending without increasing the rigidity of the connecting member (e.g., Japanese Laid-open Patent Publication No. 8-294949).

A mold clamping frame of this injection molding machine has a first member, a second member facing the first member, and a connecting member connecting the center of the first member to the center of the second member (i.e. the mold locking frame is a so-called H-type frame). A stationary platen is fixed to an upper end of the first member, and a first cylinder is fixed to an upper end of the second member. A movable platen is fixed to a piston rod of the first cylinder. The movable platen is mounted such that it can slide on top of the connecting member. The first cylinder can cause the movable platen to advance or retreat with respect to the stationary platen. By contrast, a second cylinder is fixed to a lower end of the first member. A lower end of the second member is fixed to a piston rod of the second cylinder.

In this injection molding machine, the first cylinder exerts a mold clamping force between a movable mold and a stationary mold, and the second cylinder simultaneously exerts a balancing force on the first member and the second member. As a result, a reactive force to the mold clamping force is exerted on the upper ends of the first and second members, and the balancing force is exerted on the lower ends of the first and second members. Consequently, the bending moment that occurs in the connecting member due to the reactive force to the mold clamping force is cancelled out by the bending moment that occurs in the connecting member due to the balancing force. It is thus possible to prevent bending of the connecting member during the clamping operation of the stationary mold and the movable mold.

Although it is possible to prevent bending moment from being exerted on the connecting member in this conventional injection molding machine, bending moment is exerted on the first and second members, which causes bending deformation thereof. Compared to the bending deformation of the connecting member, the bending deformation of the first and second members has a smaller effect on the parallelism between the stationary platen and the movable platen, but cannot be ignored if the mold clamping force is greater. Further, there has been a demand in recent years for a smaller mold clamping frame and increased lightness in injection molding machines. When a mold clamping frame is made smaller and lighter, the bending rigidity of the first and second members consequently decreases, causing the bending deformation of the first and second members to become more severe. In the conventional injection molding machine, it becomes impossible to maintain the parallelism between the stationary platen and the movable platen when the bending deformation of the first and second members becomes more severe. Consequently, burrs are formed on the molded part.

Accordingly, one object of the present invention is to provide an injection molding machine capable of maintaining parallelism between two mold platens even if there is bending deformation of first and second members on which a reactive force to a mold clamping force is exerted.

DISCLOSURE OF THE INVENTION

An injection molding machine according to the present invention comprises a base frame, a stationary platen supported by the base frame, and a movable platen slidably supported by the base frame. The movable platen can advance or retreat with respect to the stationary platen. The injection molding machine includes a mold clamping frame that has a first member, a second member, and a connecting member. The first member is joined with the stationary platen. The second member is joined with the movable platen. The connecting member connects the first member and the second member at their approximate centers. A mold clamping cylinder is disposed between the first member and the stationary platen or between the second member and the movable platen. The stationary platen and the first member are joined in a flexible manner, and the movable platen and the second member are similarly joined in a flexible manner. As a result, if the first and second members bend due to reactive force to a mold clamping force, the stationary platen and the movable platen change positions with respect to the first and second members, and the stationary platen and the movable platen are supported in a stable state and are not moving away from the base frame. Since the base frame and the mold clamping frame are separate parts, the base frame does not deform even if the mold clamping frame deforms. Consequently, the stationary platen and the movable platen can maintain their parallelism.

The injection molding machine may further comprise a balancing cylinder. The balancing cylinder is disposed on the opposite side of the side where the mold clamping cylinder is disposed. One end of the balancing cylinder is fixed to the first member, and the other end of the balancing cylinder is fixed to the second member. Providing the balancing cylinder allows the bending moment of the connecting member, which was caused by the mold clamping cylinder, to be cancelled out. It is preferred in the injection molding machine that the balancing cylinder and the first member are joined in a flexible manner, and that the balancing cylinder and the second member are similarly joined in a flexible manner.

With this type of configuration, even if the first and second members (at the balancing cylinder side) of the mold clamping frame deform due to the pressure exerted by the balancing cylinder, this deformation is absorbed due to a change in the joining position of the balancing cylinder with respect to the first and second members. As a result, it becomes possible to prevent excessive pressure from being exerted on the mold clamping flame or the balancing cylinder.

In the above injection molding machine, it is preferred that the mold clamping frame further comprises a first shaft and a second shaft. The first shaft supports the first member with respect to the base frame in a manner allowing the first member to rotate around the first shaft. The first shaft is disposed near a position where the connecting member is fixed. The second shaft supports the second member with respect to the base frame in a manner allowing the second member to rotate around the second shaft. The second shaft is disposed near a position where the connecting member is fixed.

With this type of configuration, if a discrepancy between the transient characteristics of the mold clamping cylinder and the balancing cylinder causes the reactive force to the mold clamping force and the balancing force of the balancing cylinder to not be in equilibrium when mold clamping begins, the first and second members rotate around the first and second shafts, thereby preventing excessive force from being exerted on the first member, the second member and the connecting member of the mold clamping frame Further, it is preferred that the first shaft and/or the second shaft are arranged and constructed to slide in the direction in which the movable platen advances and retreats. With this type of configuration, even if a distance changes between the first and second members of the mold clamping frame due to force exerted by the two cylinders, the position of the shafts changes in accordance with this change in distance. As a result, it becomes possible to prevent excessive force from being exerted on the first member, the second member and the connecting member of the mold clamping frame.

BEST MODE FOR CARRYING OUT THE INVENTION

Next, an injection molding machine according to a detailed representative embodiment of the present invention will be described with reference to FIGS. 1~5. As shown in FIGS. 1~5, the injection molding machine comprises a base frame 10, and two mold clamping frames 56, 56.

Figure 2:
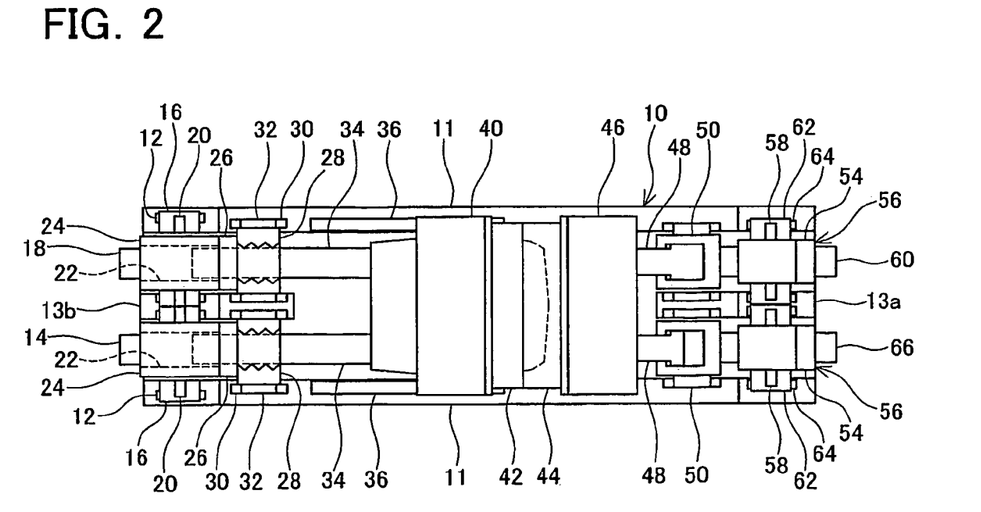
FIG. 2 is a plan view of the injection molding machine of the representative embodiment.
Figure 3:
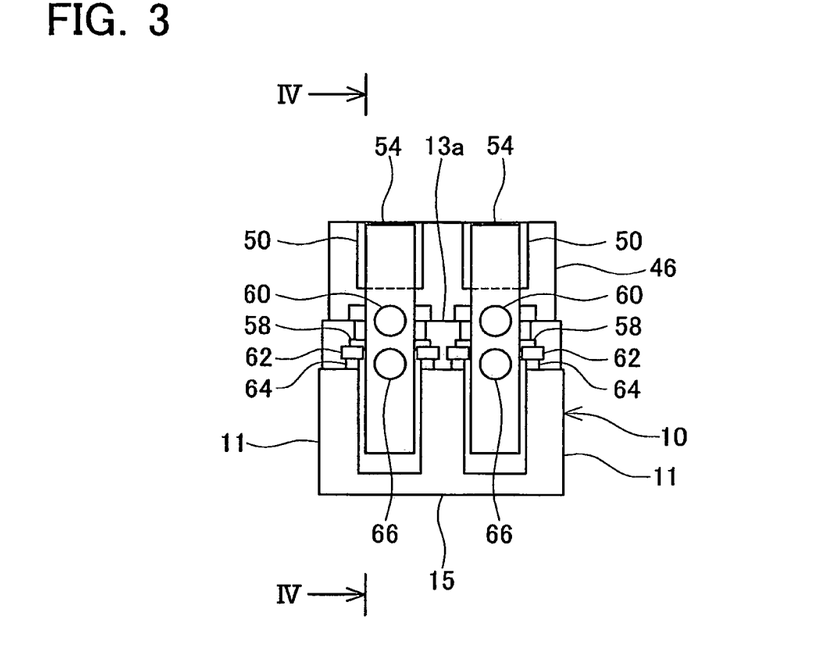
FIG. 3 is a right side view of the injection molding machine of the representative embodiment.

As shown in FIG. 2, the base frame 10 has (A) side parts 11, 11 formed at an outer side of 30 the mold clamping frames 56, 56 and parallel with the mold clamping frames 56, 56, and (B) supporting parts 13a and 13b formed between the mold clamping frames 56, 56. Lower edges of the side parts 11, 11 and lower edges of the supporting parts 13a and 13b are connected by a base part 15 (see FIG. 3).

Figure 1:
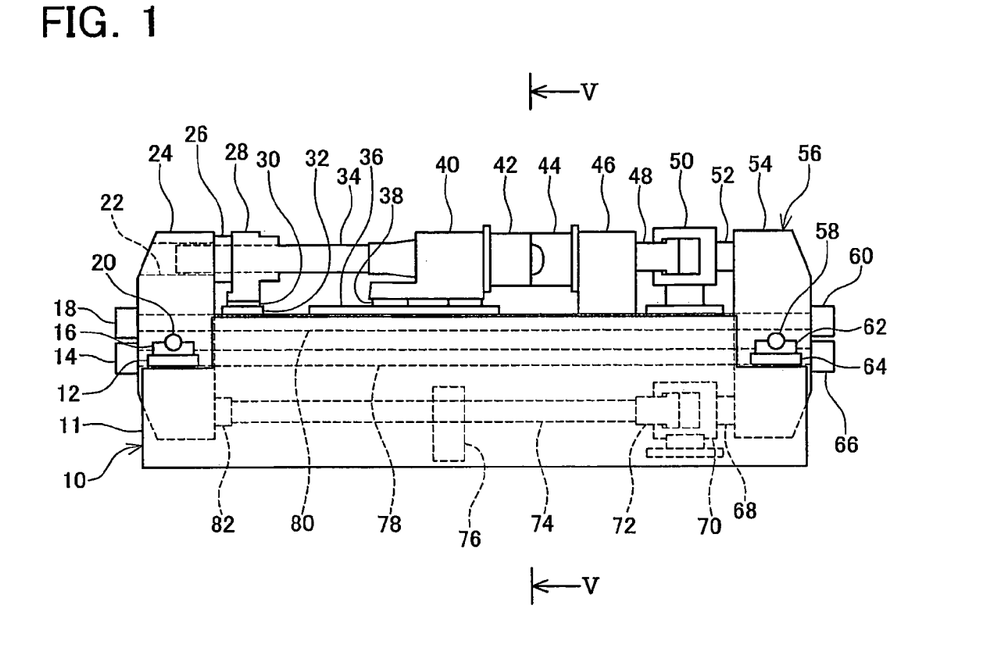
FIG. 1 is a front view of an injection molding machine of the representative embodiment.

As shown in FIG. 1, a central part of the side parts 11, 11 is taller than the end parts thereof. A stationary platen 46 is formed on an upper face of the central part of the side parts 11, 11. The stationary platen 46 is fixed such that it cannot move with respect to the side parts 11, 11. A stationary mold 44 is attached in a manner allowing removal from the stationary platen 46. An injection unit (not shown) is connected with the stationary mold 44. Melted resin is supplied from the injection unit to the interior of the stationary mold 44.

Guiding rails 36, 36 are disposed on the upper face of the central part of the side parts 11, 11. A movable platen 40 is mounted on the guiding rails 36, 36 via sliders 38. Being guided by the guiding rails 36, 36, the movable platen 40 can slide. A movable mold 42 is attached to the movable platen 40 at the stationary platen 46 side. The movable platen 40 can open or close the movable mold 42 with respect to the stationary mold 44 by being slid along the guiding rails 36, 36.

As shown in FIGS. 1 and 2, guiding rails 64, 64 are formed at the edges of the side parts 11, 11 at the stationary platen 46 side. A support 62 is mounted above each of the guiding rails 64, 64. One end of a support shaft 58 is supported in a manner allowing rotation in each of the supports 62, 62. The other end of each of the support shaft 58 is supported in the supporting part 13a by means of the same configuration as described above (see FIG. 3). As a result, the support shafts 58, 58 can also slide above the side parts 11, 11 by sliding the supports 62, 62 along the guiding rails 64, 64. Moreover, one end (i.e., the stationary platen 46 side end) of each of the mold clamping frames 56, 56 is supported in the support shafts 58, 58.

Similarly, guiding rails 12, 12 are formed at edges of the side parts 11, 11 at the movable platen 40 side. A support 16 is mounted above each of the guiding rails 12, 12. One end of a support shaft 20 is supported in a manner allowing rotation in each of the supports 16, 16. The other end of each of the support shafts 20 is supported in the supporting part 13b by means of the same configuration as described above. As a result, the support shafts 20, 20 can also slide above the side parts 11, 11. The other end (i.e., the movable platen 40 side end) of each of the mold clamping frames 56 is supported in the support shafts 20, 20.

As shown in FIG. 2, the two mold clamping frames 56, 56 are disposed in a mutually parallel manner between the side parts 11, 11 of the base frame 10. Since the two mold clamping frames 56, 56 have an identical configuration, only one of these mold clamping frames 56, 56 will be described below.

Figure 4:
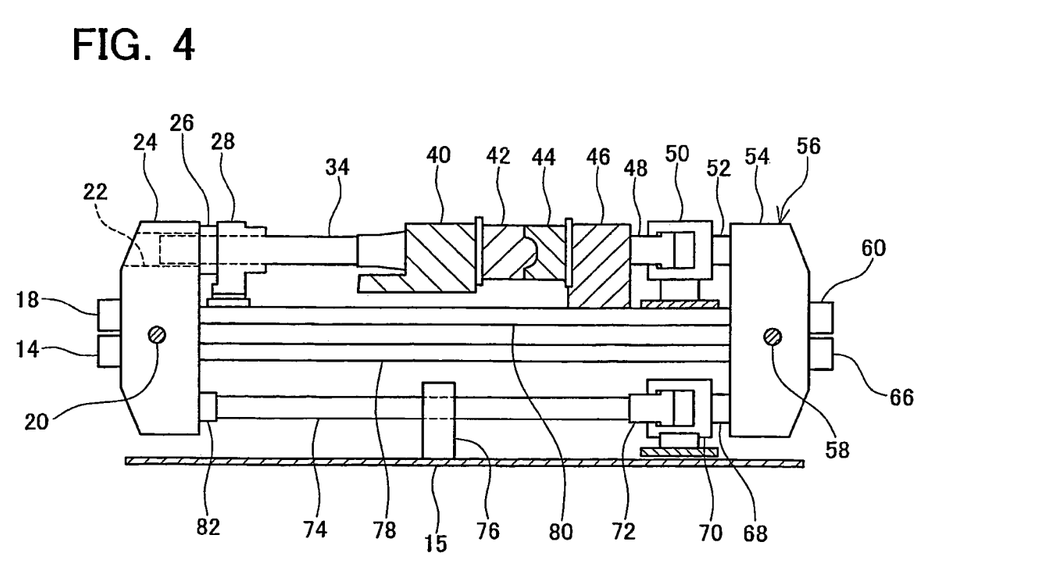
FIG. 4 is a cross-sectional view along the line IV-IV of FIG. 3.
Figure 5:
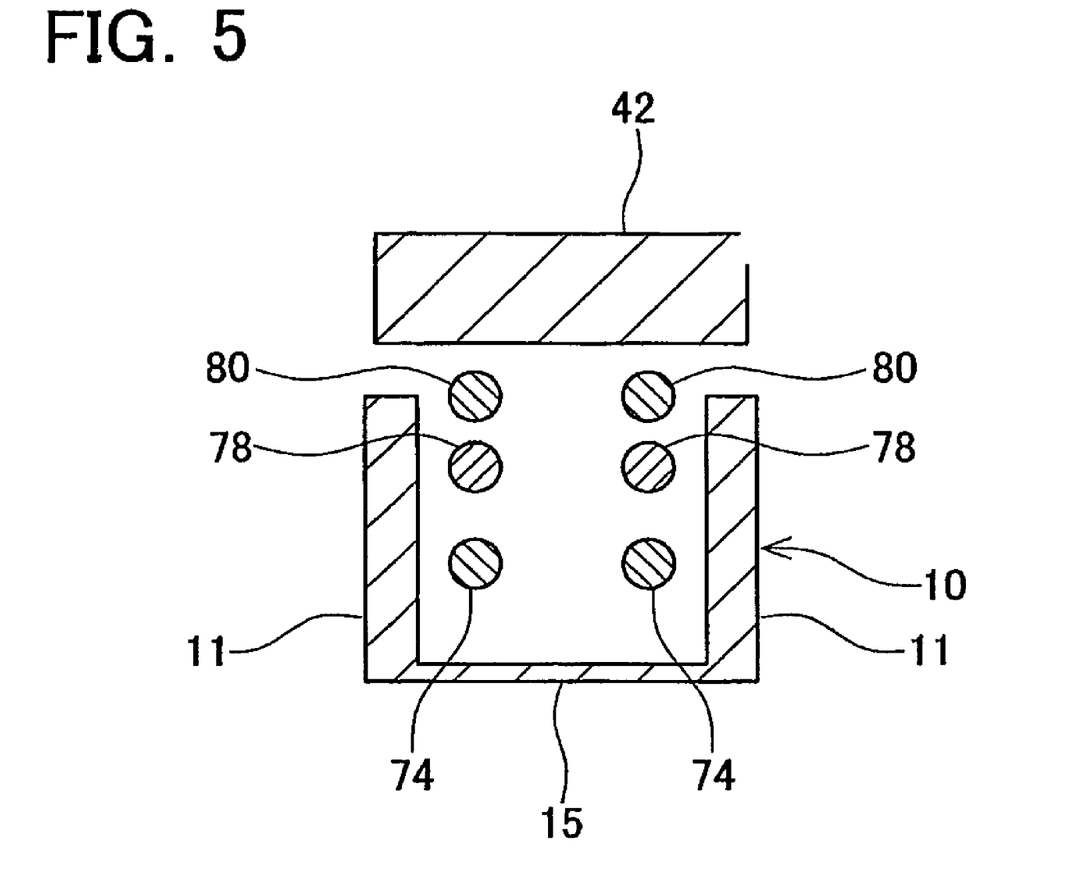
FIG. 5 is a cross-sectional view along the line V-V of FIG. 1.

As shown in FIG. 4, the mold clamping frame 56 comprises a first member 54, a second member 24, and two connecting members 78 and 80. The second member 24 faces the first member 54, and the two connecting members 78 and 80 connect a center of the first member 54 with a center of the second member 24.

The first member 54 is disposed at an end on the stationary platen 46 side. A through hole is formed in the first member 54 at approximately the center in its direction of height. The support shaft 58 passes through this through hole such the support shaft 58 can rotate. As a result, the first member 54 can rotate with respect to the base frame 10 via the support shaft 58. Further, since the support shaft 58 can slide with respect to the base frame 10, the first frame 54 can also slide with respect to the base frame 10. Furthermore, since the support shaft 58 is being supported in a manner allowing rotation in the support 62, the first member 54 can rotate with respect to the base frame 10 even if the support shaft 58 is fixed to the first member 54.

By contrast, the second member 24 is disposed at an end on the movable platen 40 side. The second member 24 is also supported in a manner allowing rotation by the support shaft 20 at the center in the direction of height of the second member 24. As a result, the second member 24 can also rotate with respect to the base frame 10, and can slide with respect to the base frame 10.

Through holes are formed at locations separated by an approximately equal distance above and below the position of the first member 54 through which the support shaft 58 passes. One end of each of the connecting members 78 and 80 passes through one of the through holes, respectively. Stoppers 66 and 60 are fixed on tips of the connecting members 78 and 80, respectively. The connecting members 78 and 80 are thus prevented from coming out of the through holes of the first member 54. The method by which the stoppers 66 and 60 are fixed on the connecting members 78 and 80 can be, for example, forming a screw on the tip of each of the connecting members 78 and 80 and forming a female screw that fits therewith on each of the stoppers 66 and 60. If this configuration is adopted, fine adjustments can easily be made to the distance between the first member 54 and the second member 24.

As with the first member 54, through holes are formed at locations separated by an approximately equal distance above and below the position of the second member 24 on which the support shaft 20 is disposed. The other end of the connecting members 78 and 80 passes though these respective through holes. Stoppers 14 and 18 are fixed on the tips of the connecting members 78 and 80 respectively, thereby preventing the connecting members 78 and 80 from coming out of the through holes of the second member 24.

As shown clearly in FIGS. 1 and 2, a mold clamping cylinder 50 is disposed for each of the mold clamping frames 56, 56 between the first member 54 and the stationary platen 46. Since the two mold clamping cylinders 50, 50 have an identical configuration, only one of these mold clamping cylinders 50, 50 will be described below.

The mold clamping cylinder 50 is mounted via a guide on the side part 11 of the base frame 10 and the supporting part 13a of the base frame 10. The mold clamping cylinder 50 can slide with respect to the base frame 10. A piston rod 48 of the mold clamping cylinder 50 is fixed to a posterior face (a face on the first member 54 side) of the stationary platen 46. A floating member 52 fixed to the first member 54 makes contact with a posterior face (a face at the first member 54 side) of the mold clamping cylinder 50. The face of the floating member 52 making contact with the mold clamping cylinder 50 is a curved face that protrudes toward the mold clamping cylinder 50. As a result, even if the first member 54 deforms, the floating member 52 can move with respect to the mold clamping cylinder 50 in accordance with this deformation of the first member 54 (i.e. the contacting positions of the floating member 52 and the mold clamping cylinder 50 can change).

For each of the mold clamping frames 56, 56, a switching mechanism is formed between the second member 24 and the movable platen 40. This switching mechanism enables switching between a state in which the movable platen 40 can slide with respect to the base frame 10 and a state in which it cannot slide. Since these two switching mechanisms have an identical configuration, only one of the switching mechanisms will be described below.

As shown in FIGS. 1 and 2, the switching mechanism comprises a rod 34, and a clutch 28 passing through the rod 34. A base end of the rod 34 is fixed to the movable platen 40. In an adjustable manner, a tip of the rod 34 passes through a through hole 22 formed in the second member 24. A comparatively large clearance is formed between the tip of the rod 34 and the through hole 22. As a result, the rod 34 and an inner wall face of the through hole 22 do not make contact.

Furthermore, a ball screw (not shown) is disposed between the movable platen 40 and the base frame 10. This ball screw is driven by a motor (not shown). When this ball screw is rotated by the motor, the movable platen 40 thus slides with respect to the base frame 10.

The clutch 28 is mounted, via a slider 30, on a guiding rail 32 formed on the side part 11 of the base frame 10 and on a guiding rail formed on the supporting part 13a.

As a result, the clutch 28 can slide slightly in a mold clamping direction (i.e., the direction in which the movable platen 40 slides). A split screw having an opening and closing mechanism attached thereto is formed on the clutch 28. The split screw engages with a screw formed at the tip of the rod 34. When the clutch 28 closes the split screw, the rod 34 cannot move in an axial direction, and when the clutch 28 opens the split screw, the rod 34 can move in the axial direction. Consequently, the rod 34 can advance towards or retreat from the clutch 28 when the clutch 28 has opened the split screw, and the movable platen 40 can thus advance or retreat on the base frame 10.

A floating member 26 makes contact with a face of the clutch 28 on the second member 24 side thereof. The floating member 26 is fixed to the second member 24. A face of the floating member 26 that makes contact with the clutch 28 is a curved face that protrudes toward the clutch 28 side. As a result, even if the second member 24 deforms, the floating member 26 can move with respect to the clutch 28 in accordance with this deformation of the second member 24.

Moreover, a through hole is formed in the floating member 26, and the tip of the rod 34 10 passes through this through hole. A comparatively large clearance is formed between the rod 34 and the through hole formed in the floating member 26. As a result, the rod 34 and the floating member 26 do not make contact.

Two balancing cylinders 70, 70 are disposed below the connecting member 78 between the first members 54, 54 and the second members 24, 24. One of each of the balancing cylinders 70, 70 is disposed on each mold clamping frame. Since these two balancing cylinders 70, 70 have an identical configuration, only one of the balancing cylinders 70 will be described below.

As shown in FIG. 4, the balancing cylinder 70 is fixed on the base part 15 of the base frame 10 at a position near the first member 54 side thereof. A piston rod 72 of the balancing cylinder 70 is fixed to a base end part of a transfer shaft 74. A central part of the transfer shaft 74 is supported by a buckling preventing support 76. The buckling preventing support 76 is fixed on the base part 15 of the base frame 10. The other end part of the transfer shaft 74 makes contact with a floating member 82.

The floating member 82 is fixed to the second member 24. A face of the floating member 82 that makes contact with the transfer shaft 74 is a curved face that protrudes toward the transfer shaft 74 side. As a result, even if the second member 24 deforms, the floating member 82 can move with respect to the transfer shaft 74 in accordance with this deformation of the second member 24.

A floating member 68 fixed to the first member 54 makes contact with a posterior face of the balancing cylinder 70 (i.e., the face at the other side from the piston rod 72). A face of the floating member 68 that makes contact with the balancing cylinder 70 is a curved face that protrudes toward the balancing cylinder 70 side. As a result, even if the first member 54 deforms, the floating member 68 can move with respect to the balancing cylinder 70 in accordance with this deformation of the first member 54.

The operation of the injection molding machine will now be described. In order to perform injection molding, the split screws of the clutches 28 are first opened, and the rods 34 are placed in a state where they can advance or retreat with respect to the clutches 28. Then the motor (not shown) drives the ball screws, and the movable platen 40 is thus slid toward the stationary platen 46. The movable platen 40 is slid until the movable mold 42 and the stationary mold 44 reach a closed state, then the driving of the motor is halted, thereby halting the sliding of the movable platen 40. Then the split screws of the clutches 28 are closed, and the rods 34 (i.e. the movable platen 40) are placed in a state where they cannot move with respect to the clutches 28.

When the movable platen 40 is in the state where it cannot move, the mold clamping cylinders 50, 50 are operated, the stationary platen 46 is pushed toward the movable platen 40, and mold clamping force is exerted between the stationary mold 44 and the movable mold 42. Then, in the state where the mold clamping force is being exerted between the stationary mold 44 and the movable mold 42, resin is injected into the interior of the stationary mold 44 and the movable mold 42.

When the mold clamping force is being exerted between the stationary mold 44 and the movable mold 42, reactive force thereof is exerted on the first members 54, 54 via the mold clamping cylinders 50, 50 and the floating members 52, 52, and is also exerted on the second members 24, 24 via the rods 34, 34, the clutches 28, 28, and the floating members 26, 26. As a result, bending moment is exerted on the first members 54, 54, pushing the upper edges of these first members 54, 54 outwards in an opening direction, and bending moment is also exerted on the second members 24, 24, pushing the upper edges of these second members 24, 24 outwards in an opening direction. Further, bending moment is exerted on both ends of the connecting members 78 and 80, bending these connecting members 78 and 80 upwards.

When the mold clamping cylinders 50, 50 are operating, the balancing cylinders 70 operate in synchrony therewith. When the balancing cylinders 70 operate, the transfer shafts 74 connected with the piston rods 72 press the second members 24, 24 via the floating members 82, 82. Further, reactive force to the pressing force on the second members 24 caused by the piston rods 72 is exerted on the first members 54, 54 via the floating members 68, 68. As a result, bending moment is exerted on the first members 54, 54, pushing the lower edges of these first members 54, 54 outwards in an opening direction, and bending moment is also exerted on the second members 24, 24, pushing the lower edges of these second members 24, 24 outwards in a opening direction. Further, bending moment is exerted on both ends of the connecting members 78 and 80, bending these connecting members 78 and 80 downwards.

As is clear from the above description, the bending moment exerted on the connecting members 78 and 80 by the mold clamping force and the bending moment exerted on the connecting members 78 and 80 by the balancing cylinders 70 are in opposite directions, and thus cancel one another out. It is therefore possible to prevent the generation of large bending moment in the connecting members 78 and 80.

Further, it is possible to reduce the bending moment exerted on the connecting members 78 and 80 by adjusting the mold clamping force caused by the mold clamping cylinders 50, 50, the distance from the connecting members 78 and 80 to the floating members 52 and 26, the pressing force caused by the balancing cylinders 70, and the distance from the connecting members 78 and 80 to the floating members 68 and 82.

Since the bending moment is exerted on the upper edges of the first members 54, 54 and on the upper edges of the second members 24, 24, the upper edges of the first members 54, 54 bend so as to open outwards, and the upper edges of the second members 24, 24 also bend so as to open outwards.

In this case, the first members 54, 54 and the mold clamping cylinders 50, 50 are joined in a flexible manner (floating manner) by the floating members 52. As a result, the floating members 52 change positions with respect to the mold clamping cylinders 50, and absorb the bending momentum of the first members 54, 54. The bending of the first members 54, 54 consequently does not affect the stationary platen 46, and the stationary platen 46 is supported on the base frame 10 in a stable state. Similarly, the second members 24, 24 and the clutches 28, 28 are joined in a flexible manner (floating manner) by the floating members 26, 26. As a result, the floating members 26, 26 change positions with respect to the clutches 28, 28, and absorb the bending momentum of the second members 24, 24. The bending of the second members 24, 24 consequently does not affect the movable platen 40, and the movable platen 40 is supported on the base frame 10 in a stable state. As a result, the movable platen 40 and the stationary platen 46 supported on the base frame 10 can remain supported on this base frame 10 in the same state as before the mold clamping force was created.

The base frame 10 is a separate component from the mold clamping frames 56, and the mold clamping force or the force from the balancing cylinders 70 does not cause deformation of the base frame 10. As a result, the parallelism between the stationary mold 44 and the movable mold 42 can be maintained while the mold clamping force is being exerted (i.e. during injection molding), making it possible to prevent burrs from being formed on the molded parts.

Moreover, the bending moment is exerted on the lower edges of the first members 54, 54 and on the lower edges of the second members 24, 24, thereby pressing the lower edges of the first members 54, 54 and the lower edges of the second members 24, 24 so as to open outwards.

In this case as well, the first members 54, 54 and the balancing cylinders 70, 70 are joined in a flexible manner (floating manner) by the floating members 68, 68. As a result, the floating members 68, 68 can change positions with respect to the balancing cylinders 70. Consequently, it becomes possible to prevent excessive force from being exerted on the first members 54, 54 or the balancing cylinders 70, 70.

Further, the second members 24, 24 and the transfer shafts 74, 74 are similarly joined in a flexible manner (floating mariner) by the floating members 82, 82. As a result, the floating members 82, 82 can change positions with respect to the transfer shafts 74, 74. Consequently, it becomes possible to prevent excessive force from being exerted on the second members 24, 24 or the transfer shafts 74, 74.

When the operation of the mold clamping cylinders 50, 50 and the balancing cylinders 70, 70 begins, the pressing force caused by the mold clamping cylinders 50, 50 and the pressing force caused by the balancing cylinders 70, 70 may not be in equilibrium. In this case, the first members 54, 54 and/or the second members 24, 24 rotate slightly around the support shafts 58 and 20, thereby preventing excessive force from being exerted on the first members 54, 54, the second members 24, 24, and the connecting members 78 and 80.

Further, tension exerted on the connecting members 78 and 80 may move the first members 54, 54 and the second members 24, 24 in a direction of mutual separation. In this case, the support shafts 58 and 20 slide slightly, thereby preventing excessive force from being exerted on the first members 54, the second members 24 and the connecting members 78 and 80.

When the injection molding has furnished, the operation of the mold clamping cylinders 50, 50 and the balancing cylinders 70, 70 is halted. Then, the split screws of the clutches 28, 28 an opened, the motor (not shown) is driven, thereby enabling the movable platen 40 to slide toward the second members 24, 24. When the movable mold 42 and the stationary mold 44 are opened, the molded part is removed from the mold.

As is clear from the above description, the mold clamping frames 56, 56 and the base frame 10 are separate components in the injection molding machine of the representative embodiment, and the stationary platen 46 and the movable platen 40 are supported on the base frame 10. The mold clamping frames 56, 56 and the stationary platen 46 are joined in a flexible manner, and the mold clamping frames 56, 56 and the movable platen 40 are similarly joined in a flexible manner. As a result, deformation of the mold clamping frames 56, 56 does not affect the parallelism between the stationary platen 46 and the movable platen 40, and it becomes possible to maintain the parallelism between the stationary mold 44 and the movable mold 42 while injection molding is being performed. Consequently, the formation of burrs on the molded parts can successfully be reduced.

Furthermore, since the injection molding machine of the representative embodiment can maintain the parallelism between the stationary mold 44 and the movable mold 42 even if the mold clamping frames 56, 56 deform, these mold clamping frames 56, 56 do not require a high bending rigidity. Further, since the parts (i.e., the first members, the second members, and the connecting members) of the mold clamping frames 56, 56 can move with respect to the base frame 10, it is possible to prevent excessive force from being exerted on these parts. The mold clamping frames 56, 56 can therefore be made smaller and lighter.

Moreover, since a plurality of mold clamping frames are provided, it is possible to exert a uniform mold clamping force on the stationary mold 44 and the movable mold 42, and damage to the stationary mold 44 and the movable mold 42 can thus be prevented.

In the embodiment described above, a so-called H-type frame was used as the mold clamping frame, and the mold clamping cylinders and the balancing cylinders were operated in synchrony. However, the technique of the present invention can also be applied to an injection molding machine utilizing a C-type frame as the mold clamping frame. In this case, both end parts (i.e., first and second members) of the C-type frame are joined in a flexible manner with the stationary platen and the movable platen. Further, the technique of the present invention can also be applied to an injection molding machine that does not have a base frame. That is, the technique can also be applied to an injection molding machine that supports the stationary platen and the movable platen on the connecting member of the H-type frame.

Furthermore, the position of the mold clamping cylinders is not restricted to the exemplary position described in the present embodiment. Instead, the mold clamping cylinders may be disposed between the movable platen and the mold clamping frame. In this case, the movable platen may be slid by the mold clamping cylinders.

Moreover, in the embodiment described above, the mold clamping frame was supported by the base frame. However, the present invention is not restricted to this form, and the mold clamping frame may be supported by a supporting frame formed separately from the base frame.

Representative embodiments of the present invention have been described in detail above. However, these merely illustrate some possibilities of the invention and do not restrict the claims thereof. The art set forth in the claims encompasses various transformations and modifications to the embodiments described above.

Furthermore, the technical elements disclosed in the present specification or figures may be utilized separately or in all types of conjunctions and are not limited to the conjunctions set forth in the claims at the time of filing the application. Furthermore, the art disclosed in the present specification or figures may be utilized to simultaneously achieve a plurality of aims or to achieve at least one of these aims.

The invention claimed is:

1. An injection molding machine comprising:
a base frame;
a stationary platen supported by the base frame;
a movable platen slidably supported by the base frame, the movable platen being guided by the base frame to advance or retreat with respect to the stationary platen;
a mold clamping frame joining with the stationary platen and the movable platen, the mold clamping frame comprising:
a first member for joining with the stationary platen,
a second member for joining with the movable platen, and
a connecting member for connecting the first member and the second member at their approximate centers;
a switching mechanism disposed between the second member and the movable platen; and
a mold clamping cylinder unit disposed between the first member and the stationary platen,
wherein
the stationary platen and the movable platen are disposed between the first member and the second member,
the mold clamping cylinder unit has a first end fixed to the stationary platen, and a first face at a second end opposite to the first end fixed to the stationary platen,
the first member has a second face that is in contact with the first face,
one of the first face or the second face has a curved face that protrudes towards the other of the first face or the second face,
the second member has a third face,
the switching mechanism has a third end fixed to the movable platen, and a fourth face at a fourth end opposite from the third end fixed to the movable platen,
the fourth face is in contact with the third face, and
one of the third face or the fourth face has a curved face that protrudes towards the other of the third face or the fourth face.

2. An injection molding machine as defined in claim 1, further comprising a balancing cylinder unit disposed on a side of the base frame opposite to a side of the base frame where the mold clamping cylinder unit is disposed, wherein the balancing cylinder unit has a fifth end joining with the first member, and a sixth end opposite to the fifth end of the balancing cylinder unit joining with the second member.

3. An injection molding machine as defined in claim 2, wherein
the balancing cylinder unit has a fifth face at the fifth end joining with the first member and has a sixth face at the sixth end joining with the second member, the fifth face of the balancing cylinder is in contact with a seventh face of the first member, the sixth face of the balancing cylinder is in contact with an eighth face of the second member, one of the seventh face or the fifth face has a curved face that protrudes towards the other of the seventh face or the fifth face, and one of the eighth face or the sixth face has a curved face that protrudes towards the other of the eighth face or the sixth face.

4. An injection molding machine as defined in claim 1, wherein the mold clamping frame further comprises a first shaft and a second shaft, the first shaft supporting the first member with respect to the base frame in a manner allowing the first member to rotate around the first shaft and being disposed proximate the approximate center of the first member adjacent to where the connecting member is fixed to the first member, and the second shaft supporting the second member with respect to the base frame in a manner allowing the second member to rotate around the second shaft and being disposed proximate the approximate center of the second member adjacent to where the connecting member is fixed to the second member.

5. An injection molding machine as defined in claim 4, wherein the first shaft and/or the second shaft can slide in a direction in which the movable platen advances and retreats.

6. An injection molding machine as defined in claim 1, wherein the switching mechanism comprises a clutch and a rod passing through the clutch, the rod is fixed to the movable platen at the third end, and the switching mechanism has an open mode allowing the rod to pass through the clutch and move the movable platen, and a closed mode restricting the movement of the rod and the movable platen.

7. An injection molding machine as defined in claim 6, wherein the clutch comprises the fourth face, and the second member makes contact with the clutch via the third face and the fourth face.

8. An injection molding machine as defined in claim 4, further comprising:

a first guiding rail fixed to the base frame; and a second guiding rail fixed to the base frame, wherein the first guiding rail is for slidably guiding the first shaft in a direction in which the movable platen advances and retreats, and the second guiding rail is for slidably guiding the second shaft in the direction in which the movable platen advances and retreats.

9. An injection molding machine as defined in claim 8, further comprising;

a first support part slidably mounted on the first guiding rail; and a second support part slidably mounted on the second guiding rail, wherein the first shaft is supported by the first support part in a manner that the first shaft is allowed to rotate in the first support part, and the second shaft is supported by the second support part in a manner that the second shaft is allowed to rotate in the second support part.

10. An injection molding machine as defined in claim 3, wherein a surface of the first member facing the second member comprises the second face and the seventh face of the first member, and a surface of the second member facing the first member comprises the third face and the eighth face of the second member.

* * * * *